United States Patent
Booij et al.

(10) Patent No.: US 11,418,936 B2
(45) Date of Patent: Aug. 16, 2022

(54) METHOD AND SYSTEM FOR RELIABLE DETECTION OF SMARTPHONES WITHIN VEHICLES

(71) Applicant: Forkbeard Technologies AS, Oslo (NO)

(72) Inventors: Wilfred Edwin Booij, Oslo (NO); Magnus Oplenskedal, Oslo (NO)

(73) Assignee: Forkbeard Technologies AS, Oslo (NO)

( * ) Notice: Subject to any disclaimer, the term of this patent is extended or adjusted under 35 U.S.C. 154(b) by 0 days.

(21) Appl. No.: 16/806,456

(22) Filed: Mar. 2, 2020

(65) Prior Publication Data

US 2020/0280831 A1 Sep. 3, 2020

Related U.S. Application Data

(60) Provisional application No. 62/812,440, filed on Mar. 1, 2019.

(51) Int. Cl.
*H04W 4/48* (2018.01)
*H04W 4/024* (2018.01)
*H04W 4/029* (2018.01)

(52) U.S. Cl.
CPC ............. *H04W 4/48* (2018.02); *H04W 4/024* (2018.02); *H04W 4/029* (2018.02)

(58) Field of Classification Search
CPC ........ H04W 4/48; H04W 4/024; H04W 4/029
See application file for complete search history.

(56) References Cited

U.S. PATENT DOCUMENTS

| | | | |
|---|---|---|---|
| 8,121,235 B1* | 2/2012 | Sun | H04B 7/0456 375/299 |
| 10,308,220 B2* | 6/2019 | Mueller | G07C 9/00 |
| 2018/0130327 A1* | 5/2018 | Rogers | G08B 21/22 |
| 2018/0234447 A1* | 8/2018 | Mueen | G06Q 50/01 |
| 2019/0082414 A1 | 3/2019 | Lei | |
| 2019/0132703 A1* | 5/2019 | Ramasamy | H04W 4/027 |
| 2019/0215672 A1* | 7/2019 | Orris | H04W 4/90 |

FOREIGN PATENT DOCUMENTS

| | | |
|---|---|---|
| EP | 3 335 441 | 6/2018 |
| WO | WO 2017/152632 A1 | 9/2017 |

OTHER PUBLICATIONS

International Search Report dated Jun. 9, 2020 for Appl. No. PCT/IB2020/051765, 3 pages.
Written Opinion dated Jun. 9, 2020 for Appl. No. PCT/IB2020/051765, 8 pages.

* cited by examiner

*Primary Examiner* — Muthuswamy G Manoharan
(74) *Attorney, Agent, or Firm* — Sterne, Kessler, Goldstein & Fox P.L.L.C.

(57) ABSTRACT

An approach for the reliable detection of smartphones within vehicles. The cloud instructs two smartphones, which both detect an in-vehicle detection system, to report signals that reflect major sensor events, together with the timing using their respective clocks. By sending local clock timing and time-sensitive beacon content information to the cloud, the offset between the two smartphone clocks may be determined, thereby enhancing the reliability of the in-vehicle detection of the smartphones.

24 Claims, 10 Drawing Sheets

METHOD AND SYSTEM FOR RELIABLE DETECTION OF SMARTPHONES WITHIN VEHICLES

CROSS-REFERENCE TO RELATED APPLICATIONS

This application claims priority to U.S. Provisional Application No. 62/812,440, filed on Mar. 1, 2019, which is hereby incorporated by reference in its entirety.

FIELD

The present disclosure relates generally to the detection of the presence of smartphones within vehicles.

BACKGROUND

Within logistics and public transport areas of endeavor, there is a strong need for reliable presence detection of smartphones within a vehicle, train, bus, ferry or other mode of transit. Currently such presence detection is haphazard, and deficient. For example, both iOS and Android-based mobile operating systems support some limited form of "car" detection. Most of these approaches are based on inertial measurement unit (IMU) and/or global positioning system (GPS) measurements.

Alternatively, Bluetooth Low Energy (BLE) beacons mounted in a vehicle are a popular way of detecting the presence of smartphones. However, various tests have shown that this approach suffers from high latency and low reliability. These deficiencies are due to RF signals that readily leak from vehicles through doors and windows.

Another specific challenge is the scenario where one vehicle follows another vehicle that has a beacon-based presence detection system. The challenge is that the presence of a smartphone in the following vehicle is nearly impossible to exclude as being present in the first vehicle, using the above methods.

The need for an effective, reliable solution for the in-vehicle presence detection of smartphones that overcomes the above deficiencies is desired.

SUMMARY

In an embodiment of the present disclosure, a method for in-vehicle presence detection of smartphones includes detecting, by a first smartphone, a signal having a characteristic of an in-vehicle detection system, and detecting, by a second smartphone, the signal, the signal including content that is unique within a time space of an offset between the first smartphone and the second smartphone. The method further includes transmitting, by the first smartphone and the second smartphone, a first indication and a second indication to a cloud solution, wherein the first indication and the second indication represent respective detections of the signal having the characteristic of the in-vehicle detection system. In addition, the method includes receiving, by the first smartphone, a first instruction from the cloud solution to analyze one or more first sensor signals to determine a first event, and receiving, by the second smartphone, a second instruction from the cloud solution to analyze one or more second sensor signals to determine a second event. The method also includes transmitting, by the first smartphone, first information reflecting the first event and its respective first timing based on a first clock of the first smartphone, and transmitting, by the second smartphone, second information reflecting the second event and its respective second timing based on a second clock of the second smartphone. Finally, the method includes cross-correlating, by the cloud solution, the first event, the second event, the first timing, the second timing and the content to generate an indication of in-vehicle presence.

In a further embodiment of the present disclosure, a computer-implemented in-vehicle presence detection system is disclosed that includes at least one processor configured to execute steps that include detecting, by a first smartphone, a signal having a characteristic of an in-vehicle detection system, and detecting, by a second smartphone, the signal, the signal including content that is unique within a time space of an offset between the first smartphone and the second smartphone. The steps further include transmitting, by the first smartphone and the second smartphone, a first indication and a second indication to a cloud solution, wherein the first indication and the second indication represent respective detections of the signal having the characteristic of the in-vehicle detection system. In addition, the steps include receiving, by the first smartphone, a first instruction from the cloud solution to analyze one or more first sensor signals to determine a first event, and receiving, by the second smartphone, a second instruction from the cloud solution to analyze one or more second sensor signals to determine a second event. The steps also include transmitting, by the first smartphone, first information reflecting the first event and its respective first timing based on a first clock of the first smartphone, and transmitting, by the second smartphone, second information reflecting the second event and its respective second timing based on a second clock of the second smartphone. Finally, the steps include cross-correlating, by the cloud solution, the first event, the second event, the first timing, the second timing and the content to generate an indication of in-vehicle presence.

BRIEF DESCRIPTION OF THE DRAWINGS

The accompanying drawings, which are incorporated herein and form a part of the specification, illustrate embodiments of the present disclosure and, together with the description, further explain the principles of the disclosure and enable a person skilled in the pertinent arts to make and use the embodiments.

Figure 1:
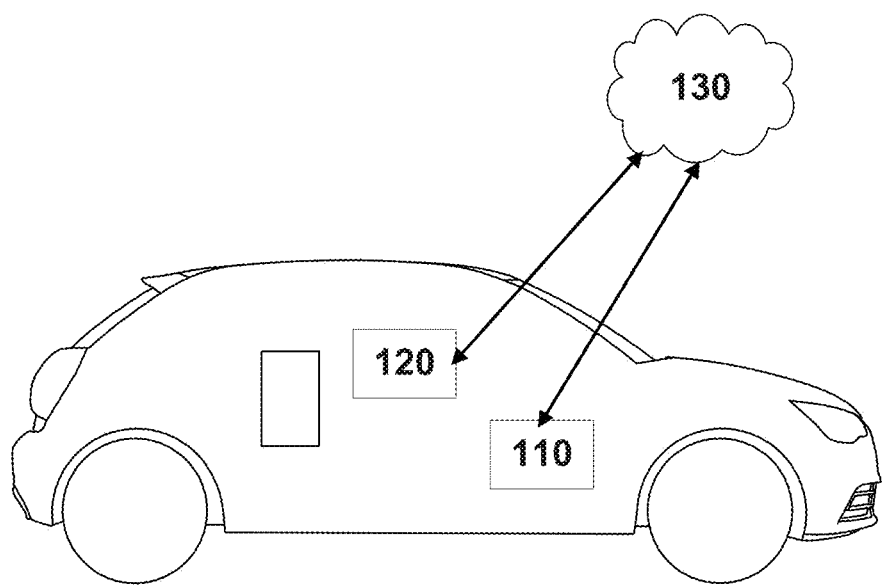
FIG. 1 illustrates an exemplary in-vehicle presence detection system, according to example embodiments of the present disclosure.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION

The present disclosure will be described with reference to the accompanying drawings. In the drawings, like reference numbers indicate identical or functionally similar elements. Additionally, the left-most digit of a reference number identifies the drawing in which the reference number first appears.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment does not necessarily include the particular feature, structure, or characteristic. Moreover, such phrases do not necessarily refer to the same exemplary embodiment. Further, when the disclosure describes a particular feature, structure, or characteristic in connection with an exemplary embodiment, those skilled in the relevant arts will know how to affect such feature, structure, or characteristic in connection with other exemplary embodiments, whether or not explicitly described.

The exemplary embodiments described herein provide illustrative examples and are not limiting. Other exemplary embodiments are possible, and modifications may be made to the exemplary embodiments within the spirit and scope of the disclosure. Therefore, the Detailed Description does not limit the disclosure. Rather, only the below claims and their equivalents define the scope of the disclosure.

Hardware (e.g., circuits), firmware, software, or any combination thereof may be used to achieve the embodiments. Embodiments may also be implemented as instructions stored on a machine-readable medium and read and executed by one or more processors. A machine-readable medium includes any mechanism for storing or transmitting information in a form readable by a machine (e.g., a computing device). For example, in some embodiments a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that the actions result from computing devices, processors, controllers, or other devices executing the firmware, software, routines, and/or instructions.

Any reference to the term "module" shall be understood to include at least one of software, firmware, and hardware (such as one or more circuit, microchip, or device, or any combination thereof), and any combination thereof. In addition, those skilled in relevant arts will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will fully reveal the general nature of the disclosure so that others can, by applying knowledge of those skilled in relevant arts, readily modify and/or customize for various applications such exemplary embodiments, without undue experimentation and without departing from the spirit and scope of the disclosure. Therefore, such modifications fall within the meaning and plurality of equivalents of the exemplary embodiments based upon the teaching and guidance presented herein. Here, the phraseology or terminology serves the purpose of description, not limitation, such that the terminology or phraseology of the present specification should be interpreted by those skilled in relevant arts in light of the teachings herein.

The fundamental idea of this approach to improve the reliability of the detection of in-vehicle presence of a smartphone is to perform accurate correlations of various smartphone sensor signals between two or more smartphones that are likely to be present in the vehicle. The likelihood of presence in the vehicle is determined from positioning signals such as, GPS, BLE, ultrasound (US), etc. The sensor signals that are used for correlation include signals from such sensors as accelerometer, gyroscope, magnetometer, pressure, microphone, infrared (IR), video, RF signal strength, and the like. In some embodiments, such correlations of sensor signals could be performed by the smartphones themselves. In other embodiments, the correlations of the sensor signals may be orchestrated through a cloud solution that all the smartphones in the vehicle have access to.

An exemplary embodiment of the approach for the detection of in-vehicle presence of two smartphones includes the following methodology. Both smartphones detect a signal that indicates it is part of an in-vehicle detection system. An indication that such a signal is part of an in-vehicle detection system includes an identification provided as part of the received signal. The signal carrying the identification includes the following signals: BLE, US, IR and other RF signals. In one further exemplary embodiment, instead of two smartphones, there is one smartphone and the other device is a vehicle mounted device with the same capabilities consistent with the functionality described herein for the in-vehicle presence detection systems.

Upon detection that the received signal is part of an in-vehicle detection system, each of the two smartphones transmits an indication of this detection to the cloud solution. In response, the cloud solution instructs both smartphones to start an analysis of one or more sensor signals received by each smartphone. The sensor signals include signals from such sensors as accelerometer, gyroscope, magnetometer, pressure, and the like. The analysis seeks to identify major events that may be identified in these signals.

Upon identification of major events, each smartphone transmits information on such events, including their timing, to the cloud solution. The timing information provided by each smartphone is determined by the clock of the respective smartphone.

Next, the cloud solution performs cross-correlations between the event information received from both smartphones. Based on the cross-correlations, in-vehicle presence is determination. For example, this determination may be made based on a probability derivation applied to the correlations.

The challenge of the above methodology is that the cloud solution has no way of knowing whether the events of the first smartphone, as detected at a time expressed in the clock of the first smartphone, is actually occurring at the same time as an event detected by the second smartphone, as expressed in a time derived from the clock of the second smartphone. This is because the clocks of the two smartphones run independently of one another.

One approach to overcome this problem is for the sensor signals to be streamed to the cloud solution in a near continuous manner. Such continuous streaming would permit a derivation of the systematic clock delay between the two smartphones. However, such an approach would be very power hungry and bandwidth hungry.

As discussed below, the inventors have pioneered a much more efficient solution to the determination of the systematic clock delay. In this solution, the in-vehicle detection system includes the inclusion of special content with the RF beacon signal. The included special content is content that is unique within the time space of a possible offset between the smartphones. One example of an approach for provision of the special content is the use of a counter value (e.g., 8-bit counter value, 16-bit counter value) within a beacon message that is transmitted every second. Such a counter value would be unique over a duration of 256 s (8-bit counter) and 32768 s (16-bit counter). The lower number (8-bit counter) is sufficient in many scenarios, given that the timing of arrival of the data send to the cloud between two devices would typically have a lower latency than 256 seconds. In an alternative approach for the provision of special content, each message could include a randomly selected sequence of a certain length (e.g., 1-4 bytes).

The detection of the special content in these RF beacon signals by both smartphones can be accurately recorded in their respective clock values (this can be the same clock as used for the sensor signals). By sending this timing (the respective clock values) and RF beacon content information to the cloud solution, the cloud solution can now detect the time offset between the two smartphone clocks. From this information, the cloud solution can accurately determine whether signal events detected and transmitted by both smartphones occur within a time window with a high degree of accuracy (e.g. 10-100 µs). By performing some additional clock modeling using a offset and drift component to the modeling, the reliability of such a method can be improved.

To make the in-vehicle presence detection more reliable, the in-vehicle system could include a smartphone or "in-vehicle device" with similar sensor and communication capabilities. This device could then be the source of all reference sensor signal events for all correlations performed to other smartphones that are within the range of the RF, IR or US beacon signal.

As a minimum, such an in-vehicle device needs the following capabilities: (1) a means of communicating with the cloud (e.g., cell data network connectivity); (2) a means of detecting the presence of a beacon signal and its timing, or alternatively transmitting the beacon signal at a time that is known in terms of the local clock of the in-vehicle device; and (3) a means of measuring one or more sensor signals such as accelerometer, gyroscope, magnetometer, pressure, microphone, IR, video, RF signal strength, and the like.

In an embodiment when such an "in-vehicle device" is present, one may also modify the methodology above such that the correlations are performed by the passenger devices. In other words, the cloud solution forwards the signal detection events from the in-vehicle device to all smartphones that are in its vicinity, as judged from the RF, US, IR beacon signal.

FIG. 1 illustrates an exemplary in-vehicle presence detection system, according to example embodiments of the present disclosure. Smartphone 110 and smartphone 120 detect a signal that indicates it is part of an in-vehicle detection system. An indication that such a signal is part of an in-vehicle detection system includes an identification provided as part of the received signal. Upon detection that the received signal is part of an in-vehicle detection system, each of smartphones 110, 120 transmit an indication of this detection to cloud solution 130. In response, cloud solution 130 instructs smartphones 110, 120 to start an analysis of one or more sensor signals received by each smartphone. The analysis seeks to identify major events that may be identified in these signals. Upon identification of major events, each smartphone 110, 120 transmits information on such events, including their timing, to cloud solution 130. The timing information provided by each smartphone 110, 120 is determined by the clock of the respective smartphone. Cloud solution 130 performs cross-correlations between the event information received from both smartphones 110, 120. Based on the cross-correlations, in-vehicle presence is determination. For example, this determination may be made based on a probability derivation applied to the correlations.

Figure 2:
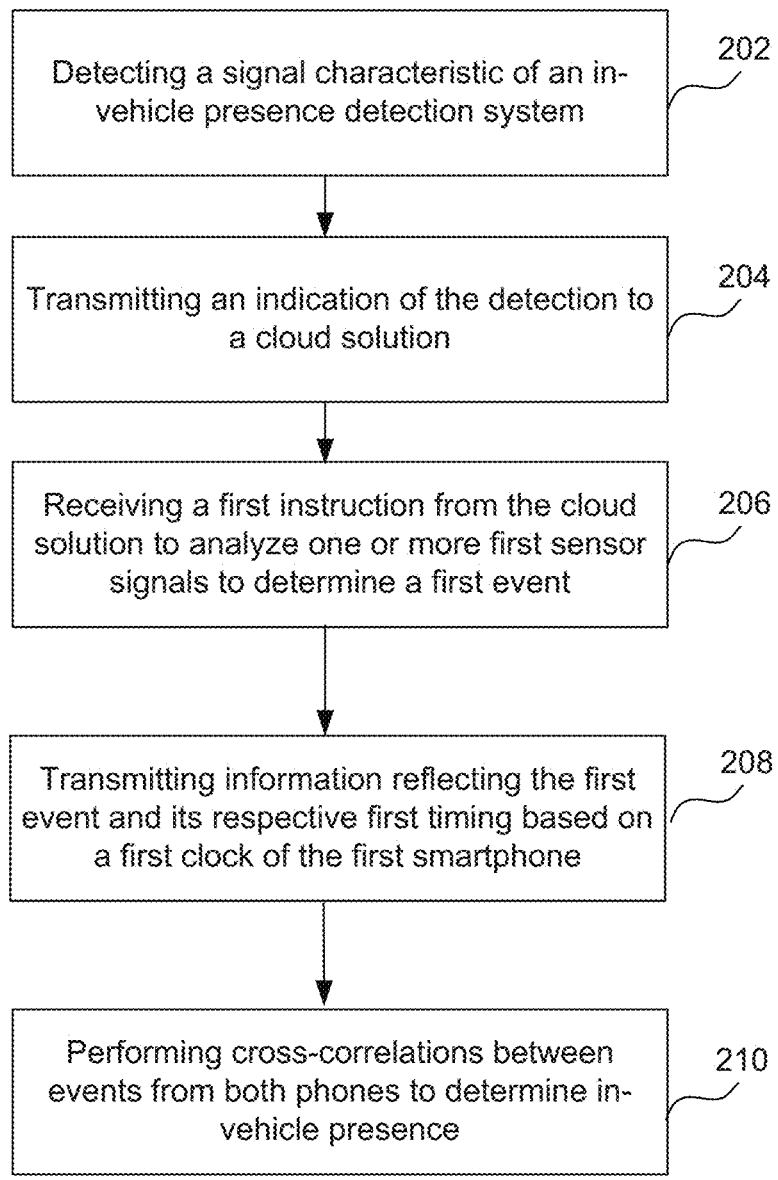
FIG. 2 illustrates an exemplary flowchart, according to example embodiments of the present disclosure.

FIG. 2 illustrates an exemplary flowchart, according to example embodiments of the present disclosure. The flowchart include the following steps. In step 202, a signal characteristic of an in-vehicle presence detection system is detected by a smartphone. A similar detection is made by another smartphone. As noted above, in one further exemplary embodiment, instead of two smartphones, there is one smartphone and the other device is a vehicle mounted device with the same capabilities consistent with the functionality described herein for the in-vehicle presence detection systems. In step 204, the indications of the detections are transmitted to a cloud solution. In step 206, an instruction is received from the cloud solution to analyze one or more sensor signals to determine an event in each smartphone. In step 208, information reflecting the first event, together with its timing, is transmitted by the smartphone to the cloud solution. A similar transmission is made by the other smartphone. In step 210, cross-correlations are performed to determine in-vehicle presence.

In a further embodiment, a transmitter (e.g., a Bluetooth transmitter) may be used to generate special signals that indicate transition events. Such transmitters may be placed in suitable locations where transition events are relevant, such as train platforms, bus stops, etc. Upon processing of the signals, the in-vehicle presence system determines that a smartphone has been located at a location where a transition event may occur, such as changing trains, buses, etc.

In further embodiments that involve large vehicles, such as trains, might require multiple beacons to cover the vehicle. In such embodiments, the multiple beacons may be synchronized. Various forms of synchronization may be used, including the gateway synchronization approach described in U.S. Appln. No. 62/623,205, filed Jan. 29, 2018, entitled "Low Level Smartphone Audio and Sensor Clock Synchronization," which is incorporated herein in its entirety. In an alternative synchronization approach, a network time protocol (NTP)-based approach for synchronization approach may be used. In a typical embodiment, the synchronization accuracy is of the order 50-1000 μs.

Artificial intelligence/machine learning may be used to provide additional embodiments. For example, with the aid of artificial intelligence algorithms, a model of typical sensor events may be built over time, where the model characterizes a vehicle journey. This model may be uploaded to the smartphones, so that these smart devices may autonomously detect in-vehicle presence.

In another embodiment, artificial intelligence/machine learning may be used to be able to detect when a user/customer is entering/leaving the vehicle. Such a capability would provide a better differentiation of an individual with the application turned on in the car next to the bus from a passenger entering the bus, staying in the bus for a certain time period and then leaving the bus. In an embodiment, the differentiation may be obtained as follows. First, when a user is registered in close proximity to a signal indicating it is part of an in-vehicle detection system, an in-device machine learning algorithm is used that is capable of recognizing human activities such as "walking," "sitting," "standing," and the like to detect the activity performed by the user. In addition, a combination is formed from the sensor output from the onboard devices, and the user's phone in addition to the activity performed by the user to detect such actions as "Enter vehicle" and "Leave vehicle."

This information may be used in addition the other sources described in this application to increase the accuracy of in-vehicle detection and to better differentiate a person in a car next to the vehicle from a person on the vehicle. It may also be valuable information for the app, to indicate when it should start the data correlation.

In a further embodiment, supervised learning may be used to train a machine learning model to recognize parts of bus routes from sensor output from many passengers over time. For example, the algorithm would be made to be able to recognize the route from bus stop A to bus stop B from the sensor output from a customer/user mobile phone. With a high enough accuracy, this could help to reduce the dependability of the system on infrastructure, since the algorithm could be embedded on the users/customers smart device.

An additional benefit of this approach is to use the trained model to detect the discriminative regions of the sensor output. In other words, the model can be used to find which parts of the registered sensor output the model finds the most important to be able to distinguish a route from all other routes. For instance, in the case of a machine learning model detecting cats in images, this technique would highlight the pixels in the image the model found to be important to be able to classify the image as a "cat". Using this strategy would provide the parts of a route unique to a given route, and could help to detect the parts of a route to be used in when correlating data from multiple devices.

In a further embodiment, unsupervised learning may be used to "cluster" routes based on sensor data from multiple customers over time. Then use, for example, kNN (k-nearest neighbors) on sensor output from a customer to detect which route the customer traveled. This would require less labeling of route information and would potentially provide a more flexible, scalable solution. The accuracy achievable by this solution, however, is unknown and would require empirical studies to establish this accuracy.

In various artificial intelligence/machine learning embodiments, the following machine learning models/techniques could potentially be used, but not limited to: decision tree, random forest, support vector machine, naive Bayes, hidden Markov models, deep fully connected neural network, convolutional neural network, auto-encoders and stacked auto-encoders, restricted Boltzmann machine, deep belief network, recurrent neural network or hybrid models such as combinations of CNN (convolutional neural networks) and RNN (recurrent neural networks).

In a number of embodiments above, instructions are received from the cloud solution for the smartphones to analyze one or more sensor signals to determine an event. In a different embodiment, the smartphones autonomously decide what sensor signals to analyze to determine events, and to also decide on the timing of transmission to the cloud solution. In other words, in these embodiments, the smartphones do not receive instructions from the cloud solution on what to transmit. In these embodiments, both smartphones employ a similar algorithm that determines the selection of interesting portions of the various sensor signals for analysis, and/or events that are transmitted to the cloud solution.

Further details on the above concepts is provided below. FIG. 1 shows a simple scenario highlighting various embodiment of the approach. Three passengers travel in a bus. Their smartphones are provided with an application supporting similarity learning context (SiLeCon). As fixed equipment, the bus carries a BLE-transmitter and a reference device (RefDev) that uses the same type of sensors as found on the smartphones. The reason for our choice of sensors will be described more in detail below. When the passengers enter the bus, a pre-installed application is awoken by the OS based on detecting the BLE signal. The application then immediately starts measuring sensor data. Moreover, it performs feature extraction converting the sensed data to a lower dimensional representation. The compressed version of the data is provided by a time stamp as well as a tag carrying the ID of the BLE signal. The information is then transmitted to a remote cloud service. Simultaneously, RefDev is measuring, transforming and transmitting its own sensor data to the same cloud service. Thus, the cloud service receives two sets of data that it can compare to find out whether the two sensors of the data are in the same vehicle. For that, a special similarity module is applied to carry out the necessary similarity measurements. It is explained to greater detail below. If two data sets with the same BLE-transmission ID are predicted to be collected in the same vehicle, and one of them is produced by RefDev, the other one has to be inevitably produced by a smartphone in the same vehicle.

In an embodiment, SiLeCon uses only barometric sensor data for similarity detection. The barometer is a sensor introduced in smartphones primarily to reduce the GPS delay by providing the z coordinate. The barometer provides highly accurate contextual information such that it is suited for the in-vehicle presence analysis. In particular, it is very precise independently of the position of a vehicle. Further, it is quite resistant to vibrations and sudden user movements as well as highly sensitive to changes in elevation. Position-independence, e.g., the sensor's ability to provide useful data independently of the sensors location, is particularly important for underground transportation in tunnels and subways where the GPS is not working. Vibration resistance is important to capture the movements of the vehicle rather than the movements of the user. Here, the barometer has a clear advantage over the accelerometer and gyroscope sensors that are much more sensitive to the movements of a user's hands than the movement of a vehicle. Finally, a high elevation sensitivity is critical for extracting useful context data in flat areas. In a particular embodiment, it is reported that the Bosch BMP280 barometer sensor used in certain mobile phones is sensitive to elevation changes of 10 to 20 cm. Below, a test is discussed giving evidence that the barometer also works well in very flat terrain.

As mentioned above, the vehicle is provided with a RefDev and a BLE transmitter. To employ exemplary embodiments, the data produced by the RefDev is necessary for the comparison with those sensed by the smartphones of the users.

TABLE 1

Example Datapoints

| Sensor | Value | Timestamp | Trip | Device |
|---|---|---|---|---|
| Acc. X | 0.117311 . . . | 3366 . . . | 15 | 75i3 . . . |
| Barometer | 993.287 . . . | 3366 . . . | 15 | 75i3 . . . |

In contrast to the alternative communication technology-based approaches, the BLE transmitter is not directly used for in-vehicle detection, but rather to wake up the application when entering a vehicle as well as aligning the data with those of the RefDev. Both, Android and iOS provide the ability to start "sleeping" applications when a BLE-signal with a predefined ID is detected. Thus, our application will only turn on and collect data when the phone is close to a BLE-transmitter registered in the application. Due to the imprecise nature of BLE, a transmitter may not only be readable in its own vehicle but also in its environment. In this case, e.g., in a bus terminal, a smartphone may read several BLE transmitter inputs simultaneously. The IDs of these BLE transmitters are sent together with the collected data to the cloud service. In this way, the cloud service does not need to compare the user data with those of all RefDevs in the transport network but only with those related with detected BLE transmitters. This effectively reduces the workload of the cloud service significantly.

Mobile Data Analysis

The deep learning model of embodiments of the present approach performing the in-vehicle prediction has to be trained based on real sensor data collected from RefDev and passenger devices. In this discussion, it is described how the real sensor data traces were collected and converted to the training and evaluation datasets used to train the model.

Data Collection and Preprocessing

The sensor data traces used to train our deep learning model were collected by means of an application developed for this purpose. The application can be configured to collect data from any available sensor in the smart device, and to store and timestamp them locally as datapoints (see Table 1). The data from various runs can then be uploaded to a computer running various data analysis tools. Moreover, the application contains a simple server-client communication protocol using websockets. This allows one to connect several devices providing synchronized collections of sensor data. The data collection is performed between two stops along the route of a public transportation provider, where all datapoints collected between the two stops are stored as a Trip. All trips are registered with a unique trip ID propagated from the server device to all clients. Further, as described above, each datapoint is timestamped.

While certain embodiments use only barometric data at the moment, one may also collect the inputs from other sensor types to enrich the mobile data analysis. The sensor framework provided by the operating system of the mobile device allows developers to determine the sampling rate of each available sensor. The sensors will provide data, using this sampling rate as a guideline, usually with a standard deviation of one to two milliseconds. To measure sensor data similarity, however, one needs a fixed sampling rate across all sensors and devices for a trip. This is achieved through a data analysis tool by interpolating the data collected by each device individually. The interpolation of a trip's data is done by (1) defining a global start time extracted from its data, (2) subtracting this start time from the timestamps of all datapoints to get a relative timestamp, where the timestamp for the first datapoint is 0 ms.

TABLE 2

Example Interpolated Data

| Timestamp | Accel. | Magneto. | Barom. | Gyrosc. |
|---|---|---|---|---|
| 0 ms | 0.11731 . . . | 33.222 . . . | 993.26 . . . | 0.0311 . . . |
| 20 ms | 0.11342 . . . | 44.321 . . . | 993.26 . . . | 0.0092 . . . |

Then, for each sensor data set, one interpolates the values with a fixed frequency, and finally remove the original data. With these fixed timestamp and interpolated values, one can now create a new table where the rows represent timestamps and each column contains the value for a sensor for the given timestamp (see Table 2).

Dataset Creation

An important goal of various embodiments of this approach is to minimize the amount of data needed to perform in-vehicle detection and to reduce the number of calculations performed on the cloud server. To this end, a model has been trained to perform predictions based on smaller segments of the trip data. Converting the interpolated trip data shown in Table 2 into trip segments is performed automatically by a data analysis tool. The segment length and number of sensors included in a segment are configurable parameters in the tool. However, when training and using the deep learning model, these parameters have to be the same for all segments. Furthermore, all segments are tagged with the ID of the trip they belong to, in addition to a segment number, e.g., the first segment of a trip with id 15 becomes 15_0, the next 15_1, etc. This will be the same for all devices used to gather data for Trip 15.

The created segments are used to build samples for a similarity dataset. The samples in this dataset belong to either Class 1 or Class 0. Class 1 consists of samples from segments with the same trip id and segment number, i.e., the sensor data captured by two devices at the same time in the same vehicle. Samples from Class 0 are created from segments either with different trip ids, or different segment numbers, representing sensor data not captured at the same time or in the same vehicle, as shown in FIG. 2.

Design and Architecture of the Learning Model

Figure 3:
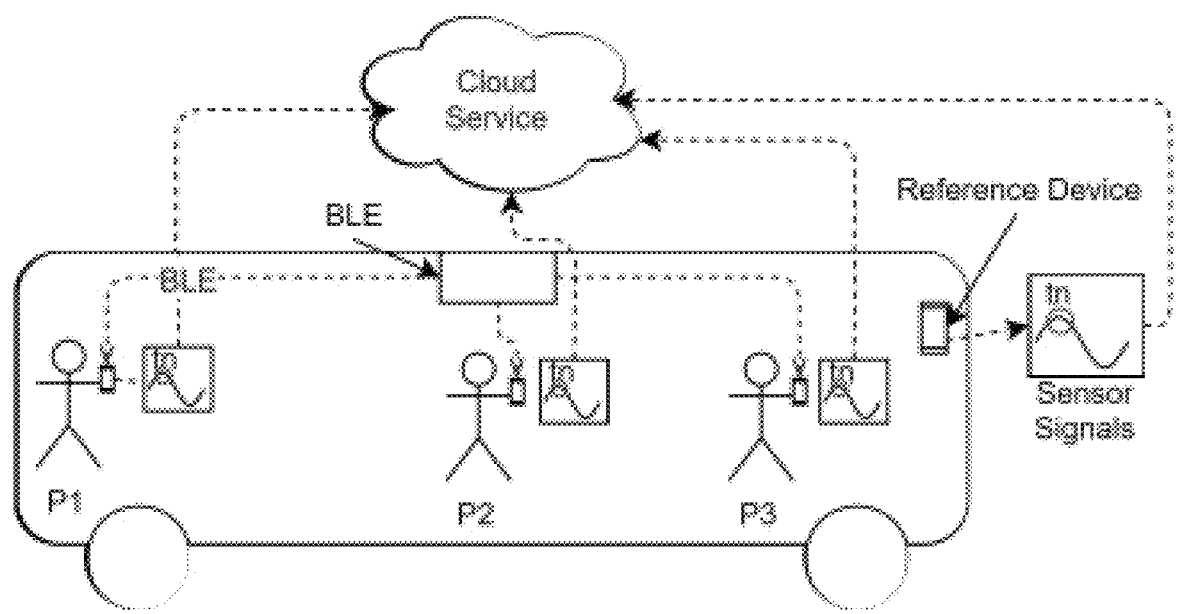
FIG. 3 an exemplary in-vehicle presence detection system, according to example embodiments of the present disclosure.

One goal of certain embodiments of the learning model is to perform feature extraction, dimensionality reduction, and similarity detection. As already mentioned, the overall in-vehicle presence detection process will be performed in a distributed fashion that is depicted in FIG. 3. The feature extraction and dimensionality reduction take place in both, the smartphones of the passengers and the reference devices fixed in the vehicles. They are performed by Encoder Modules, which are shown in form of green networks in FIG. 3. These encoders reduce the size of the original sensor inputs by a factor of four. In consequence, the bandwidth necessary to transport the sensor inputs from the devices to the cloud will be reduced to a fourth in comparison to sending all the originally sensed data. The main objective of the encoder is to guarantee the preservation of characteristics and features of the data necessary for accurate similarity detection.

The encoder is part of a neural network topology, which may be called an autoencoder that is composed of two parts, an encoder and a decoder. Autoencoders are used to learn efficient, often lower-dimensional, representations of their input through unsupervised training. The encoder maps the autoencoders input to a latent representation in a latent space, i.e., an internal representation of its input. The decoder maps this latent representation to a reconstructed representation of the autoencoder's original input. The amount of information passed from the encoder to the decoder is typically restricted, forcing the autoencoder to prioritize the most relevant information in its input. In an embodiment, the autoencoder, the encoder is restricted in the form of dimensionality reduction, leading to a size reduction by the factor four.

In certain embodiments, the similarity predictions are performed on the cloud server by a fully connected deep neural network, called a similarity module. It is depicted as a blue network in FIG. 3. To get a good accuracy of detecting in-vehicle presence, this module has to learn and fine-tune the spatiotemporal thresholds to distinguish the samples in from those in Class 0, i.e., segments either sensed during different trips or at different locations.

Figure 4:
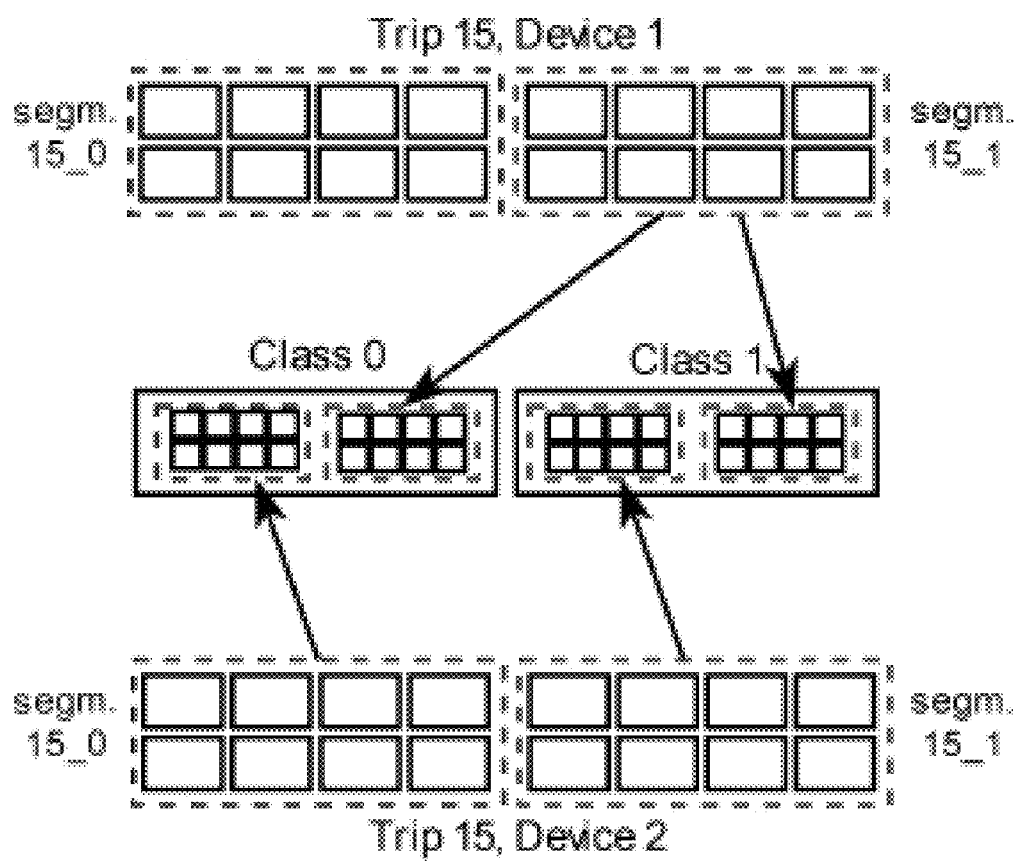
FIG. 4 illustrates exemplary similarity samples created from trip segments, according to example embodiments of the present disclosure.

The similarity module and the autoencoder are developed and trained jointly using the architecture shown in FIG. 4. The autoencoder, in certain embodiments, is a stacked convolutional autoencoder (CAE). In a CAE, the encoder is created from stacks of alternating convolutional and maxpool layers, where the convolutional layers are responsible for feature extraction and the maxpool layers are responsible for dimensionality reduction. As previously mentioned, the decoder is the part of the autoencoder responsible for recreating a copy of its input from the latent representation output by the encoder. It is created from stacks of alternating conv and up-sample layers. Conv layers are specially suited to detect and extract time-invariant features in sequence data. The maxpool layers perform dimensionality reduction using the max operator. The up-sampling layers reverse this process by doubling each value in its input sequence, e.g., the sequence 1, 2, 3 would become 1, 1, 2, 2, 3, 3.

In FIG. 4, the specifics of the deep model are shown. Green, orange, and blue boxes represent the trainable layers, whereas the grey boxes represent layers used to manipulate the size/shape of the data flowing between two consecutive trainable layers. Each convolutional layer (marked with Conv1D) shows the number of filters and its filter-size following <Number of filters>*<Filter Size>, where each box represents the three following operations sequentially: 1D-convolution, followed by rectified linear unit activation (ReLU) (i.e., relu(x)=max(0,x)), and lastly batch normalization. The maxpool layers all use a stride size of 2, effectively reducing the size of their input to 50%. The flatten layer is used to reshape any N-dimensional input to a 1-dimensional output, while all the up-sample layers use an up-sample step of 2, doubling the size of their input. In our model, the encoder consists of four convolutional layers, three maxpooling layers, one flatten layer and one dense layer. The decoder consists of five convolutional layers, three up-sample layers, one reshape layer and one dense layer. The last part of the learning model in certain embodiments, the similarity module, consists of three consecutive fully connected dense layers, all using ReLU activation and batch normalization.

To train the overall model depicted in FIG. 4, the CAE is duplicated. Both CAE copies share all trainable parameters W. This network topology is known as a Siamese Architecture. It may be applied with great success in similarity detection problems like face recognition, signature verification, and human identification using gait recognition. The Siamese architecture allows the model to accept two sensor data segments at the same time, e.g., segment $X_a$ and $X_b$. Since the two CAEs share the same weights, the encoder performs an identical mapping of the segments. Therefore, if the segments are similar, e.g., they belong to a sample of Class 1, the latent representations $e_a$ and $e_b$, dark grey boxes in FIG. 4, should also be similar, and the opposite should be true for samples belonging to Class 0. Through joint training of both CAE and the Similarity module, the encoder will learn to prioritize features of the segments, necessary for the decoder to recreate it, as well as to prioritize the features needed by the similarity module for similarity detection.

Model Training

This particular discussion describes the training routine for the model shown in FIG. 4. Let $X_a$ and $X_b$ be two sensor data segments belonging to a similarity sample as described above. Let Y be the binary label describing the samples ground truth class, Y=1 for Class 1, and Y=0 for Class 0. Through the CAEs encoder layers, both segments $X_a$ and $X_b$ are mapped to their lower-dimensional latent representations $e_a$ and $e_b$, shown as dark green squares. Thereafter, one maps the latent representations $e_a$ and $e_b$ through the decoder layers. This results in the segment recreations $X_a'$ and $X_b'$. Finally, one feeds the latent representations to the similarity module to get the class prediction Y', where the goal of the model will be to achieve Y'=Y.

During training, the goal is to reduce the disagreement between the predicted Y' and the ground truth label Y, but also between the recreated segments $X_a'$ and $X_b'$ as well as the original $X_a$ and $X_b$.

To this end, we quantify the disagreements using the following two loss functions: For the CAEs, we use Mean Squared Error:

$$L = \frac{1}{n}\sum_{t=1}^{n}(X_a'[t] - X_a[t])^2$$

Here, n is the overall time span of segment $X_a$ while $X_a'[t]$ is the recreation of the datapoint $X_a[t] \in X_a$ at the point of time t. Further, one applies binary cross entropy as a loss function for the similarity module:

$$L = -Y \cdot \log(Y') + (1-Y) \cdot \log(1-Y')$$

Y' is the predicted label of the sample containing segments $X_a$ and $X_b$, and Y its ground truth. The disagreements found by the loss functions described above is used to update the trainable parameters of the model through Stochastic Gradient Descent. We emphasize that the gradients from both loss functions are backpropagated to the encoders. This enables the encoders to extract not only the most defining features of its input, but also the features relevant for similarity prediction.

Design Rationale Behind the Approach Model

The proposed model has been achieved through hundreds of experiments on various model configurations. Every configuration was evaluated using the performance metrics on the dataset, as described below. To obtain a useful model architecture, one may try increasing as well as decreasing the number of convolutional layers in the CAEs and swapping the convolutional layers for dense layers. Moreover, we tried multiple variants of the similarity module, using convolutional layers instead of dense layers, varying the size and number of dense layers, and also ex-changing the similarity module with a function calculating the Euclidean Distance between the latent representations and using this for similarity predictions. Stacking convolutional layers was tried as feature extractors instead of using autoencoders, removing the need for loss calculations between the input and recreated segments. None of these approaches achieved the same accuracy as the model in FIG. 4. In addition to different model architectures, various hyperparameter settings were tested such as adjusting the number and sizes of filters in each cony layer, and trying various output sizes on the dense layers of the similarity module. Having done all these hyperparameter tunings, the architecture in FIG. 4, using the hyperparameter settings described above, gave the best performance.

Evaluation

In this particular discussion, we first describe the performance metrics that we use to evaluate our learned models. Thereafter, we explain how the data for used during training and evaluation was collected and pre-processed. Moreover, we show the performance results for three variations of our model. The variants differ in the numbers of data points used for similarity detection:

SiLeCon 5: This model uses segments comprising 256 data points that are sensed over a period of five seconds. Due to the feature extraction and dimensionality reduction provided in the devices, only a fourth of the input data, i.e., 64 float values, are transmitted to the cloud service.

SiLeCon 10: Here, the sizes of the analyzed segments are doubled. Thus, we use 512 data points taken over ten seconds reduced to 128 data points for transfer.

SiLeCon 15: The segment length of this variant is 15 seconds and a segment consists of 768 sensed data points and 196 float values are sent to the cloud.

To compare the variants of this approach with existing technology, we also consider two baseline methods. The result of all five methods applied to our data sets is discussed and the differences in performance elaborated. In addition, we refer to the special case of very flat terrain, that can be problematic using only barometer data as input in this approach. Afterwards, we investigate the execution time overhead of the similarity module running in the cloud followed by a discussion about battery usage of this approach running on smartphones.

Definitions and Metrics for Evaluation

A positive sample represents segments belonging to Class 1, and a negative sample those from Class 0. Furthermore, according to the common denominations in binary classification, a correctly classified positive sample is named True Positive (TP) and a correctly classified negative sample True Negative (TN). Moreover, one calls a positive sample wrongly classified as negative False Negative (FN) and a negative sample falsely classified as positive False Positive (FP).

The following four metrics are used for evaluation:
Precision (PR): The ratio of correct positive predictions to the total number of predicted positive samples, i.e., out of all samples classified as positive, how many belong to Class 1. Formally, that can be expressed as follows:

$$PR \triangleq \frac{TP}{TP + FP} \quad (1)$$

Recall (RE): The ratio of correct positive predictions to the total number of positive samples, i.e., out of all available positive samples in the dataset, how many were correctly classified by the model:

$$RE \triangleq \frac{TP}{TP + FN} \quad (2)$$

Accuracy (ACC): In a dataset with a 50/50 class distribution, the accuracy describes how good the model is at classifying samples from all classes, i.e., it describes the share of all correct predictions against all predictions:

$$ACC \triangleq \frac{TP + TN}{TP + FP + TN + FN} \quad (3)$$

F1-score (F1): It describes the harmonic mean between precision and recall. The F1-score is useful in cases where the distribution of classes is not 50/50. A good model evaluated on a dataset with 50/50 class distribution will have both, a high accuracy and a high F1-score:

$$F1 \triangleq 2 \cdot \frac{PR \cdot RE}{RP + RE} \quad (4)$$

Moreover, we plot the results in a Receiver Operating Characteristics (ROC)-graph which describes how good a function and/or a model is at distinguishing between the classes in the dataset. The measurements for the three SiLeCon variants and two baseline methods according to these metrics will be discussed below.

Data Collection and Dataset Creation

The data was collected by three volunteers, each carrying one to three smartphones. All phones were connected through the application discussed above. The data was collected in the trips made by public transportation (i.e., trains, subways, busses and trams) in Oslo and Trondheim, two Norwegian cities. In total, 160 unique trips were registered with durations between 30 and 300 seconds. The data from all trips was used in the creation of datasets for the various models. For instance, 21,252 unique sensor data segments of size 512 taken with a frequency of about 20 milliseconds were created for SiLeCon 10. Thereafter, we split the segments into training and evaluation datasets. As common in machine learning, 70% of the segments were used for training and 30% for evaluation. Similarity sets were created separately for both the training and evaluation sets. This resulted in a training dataset of 180,408 and an evaluation set of 67,304 unique samples.

The creation of the similarity sets was performed separately for the training and evaluation sets to avoid using the same sensor data segments in both phases. In this way, any segment used in the evaluation set has never previously been seen by the model. In both sets, we selected each 50% of the segment pairs from Class 0 and Class 1.

Baseline Methods

To get a meaningful comparison with SiLeCon, we also chose two baseline methods:

Normalized Correlation (NORM_CORR) calculates the correlation between two sequences by comparing datapoints in the same temporal position in the sequences.

Dynamic Time Warping (DTW) compares all datapoints in two sequences by warping the temporal dimension to find the best correlation for any datapoint in two sequences. Since DTW describes the distance between two sequences, where a large distance equals a small correlation, we inverse the results from this function.

The goal was to find a way to classify instances belonging to the two classes in the dataset, using these methods. The assumption is that applying either method on samples belonging to class 1, should provide a large value, while samples belonging to class 0 should return a small value. To this end, we used the following equations:

$$c = f(X_a, X_b), Y' = \begin{cases} 1 & \text{if } e > \alpha \\ 0 & \text{else} \end{cases}$$

TABLE 3

Confusion Matrix

|  | Predicted Positive | Predicted Negative |
|---|---|---|
| Actual positive | 33018 | 634 |
| Actual negative | 842 | 32810 |

TABLE 4

Performance Comparison with Baseline Methods

| Model | PR | RE | ACC | F1 |
|---|---|---|---|---|
| SiLeCon 5 | 0.94082 | 0.97645 | 0.95735 | 0.95833 |
| SiLeCon 10 | 0.97513 | 0.98116 | 0.97807 | 0.97814 |
| SiLeCon 15 | 0.93479 | 0.98164 | 0.95656 | 0.95762 |
| NORM_CORR | 0.91739 | 0.95947 | 0.93932 | 0.93796 |
| DTW | 0.98098 | 0.73499 | 0.81364 | 0.84035 |

Here, the function $f$ represents either of the two baseline methods, and c the result of applying $f$ to the segments $X_a$ and $X_b$ in a sample from the dataset. The delimiting value a is used to classify instances of the two classes from their c values. To find $\alpha$, we first apply $f$ to all samples in the training set and add the resulting c-values to a sorted array. Thereafter, we search for the optimal delimiting value $\alpha$, best able to separate instances in the sorted array. If the value c for a sample is larger than the delimiting value $\alpha$, the sample is assumed to belong to Class 1. Otherwise it should belong to Class 0. Optimal $\alpha$ values were searched for both NORM_CORR and DTW using the training set. Then, we evaluated the functions and their corresponding $\alpha$ values on the evaluation set. The results of our experiments are discussed below.

Experimental Results

During the development of our model, we continuously evaluated our results using the metrics described above. The confusion matrix, i.e., the overall number of TP-, TN-, FN-, FP-rated samples, for SiLeCon 10 is listed in Table 3. The values of the confusion matrices for the three learned and two baseline models allow us to compute the outcomes according to the four metrics introduced above for all of them. The results are presented in Table 4 and discussed below.

Learned Models

From the numbers in Table 4, one can conclude that for all performance metrics, SiLeCon 10 is outperforming SiLeCon 5. This is caused by the difference in segment sizes for the two models, 512 and 256 data points respectively. Thus, the former model has more data to learn from than the latter, which explains the higher quality of its performance. According to this explanation, however, SiLeCon 15 with its 768 data points should outperform the two other models. This is true for RE but not for the other three metrics where it underperforms at least SiLeCon 10. Due to the bad PR value in comparison with the good RE result, the model seems to be biased towards classifying samples as positive which leads to an extended number of false positives. Probably, the composition of 15 seconds long segments of our learning set is non-representative which leads to learning a sub-optimal classifier. Using a larger dataset, we believe SiLeCon 15 would outperform SiLeCon 10.

Baseline Methods

From Table 4, one can see that RE, ACC, and F1 of both baseline methods are lower than the corresponding metrics for the learned SiLeCon models. The sole exception is the metric PR for which DTW gave a better result than both, the SiLeCon variants and NORM_CORR. The reason for this is a correlation of DTW to negative samples that we discuss below. That causes the consequence, that DTW produces only relatively few false positives which renders the good result for PR. Instead, it generates a significant number of false negatives spoiling the values for the other metrics.

Altogether, the two baseline methods seem to be less suited for in-vehicle presence detection than SiLeCon. For NORM_CORR, we believe this is due to the sensitivity of the function to time-lag between its input sequences, e.g., a passenger sitting a couple of meters behind the RefDev in the bus, will experience a lag between the signals which will result in a lower correlation value for positive samples. Therefore, the correlation value for some of the positive samples will be mixed with the correlation value for negative samples resulting in a less optimal delimiter.

The low performance of DTW is most likely caused by its total lack of sensitivity to the temporal dimension. DTW is warping the temporal dimension between the two sequences to find the shortest distance. This will result in a too high correlation value for some negative samples, making it difficult for the delimiter to separate samples from the two classes. As a result of this, there are relatively few false positives at the expense of many false negatives which explains the discrepancy of DTW's results for the different metrics in Table 4.

Figure 5:
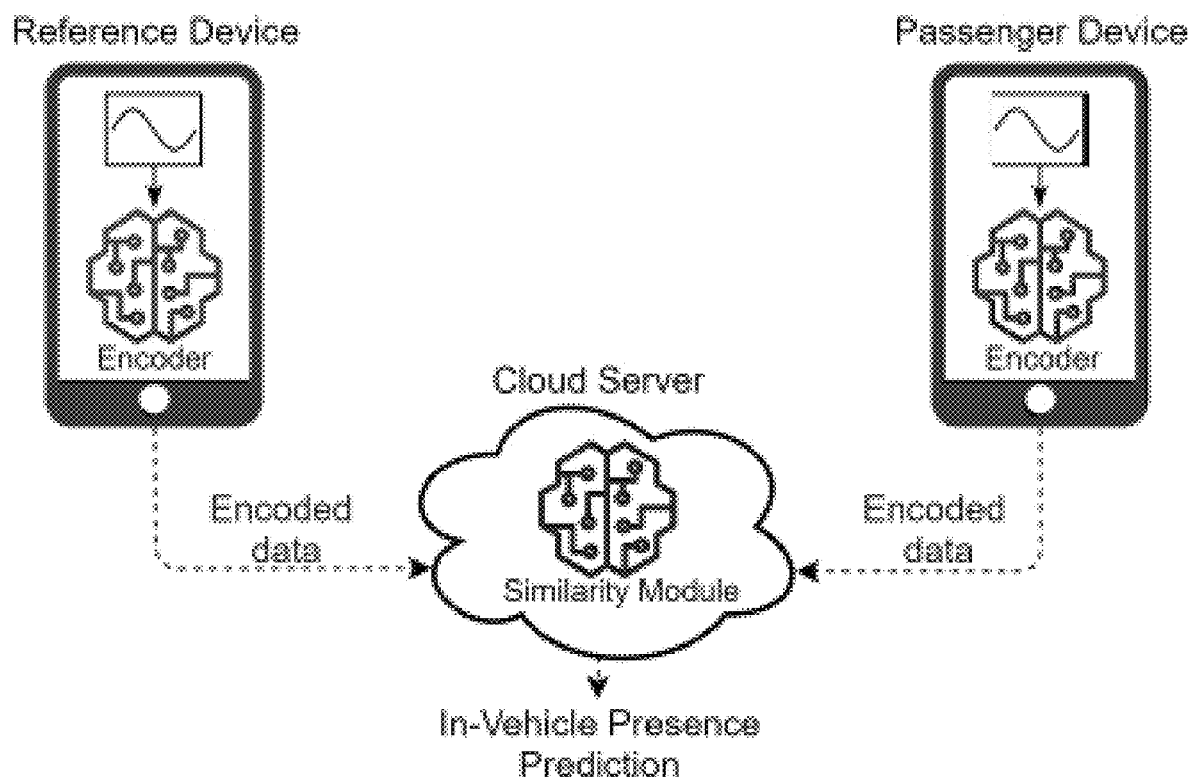
FIG. 5 illustrates an overview of an exemplary SiLeCon model design, according to example embodiments of the present disclosure.

Similar results can be observed in the Receiver Operating Characteristics (ROC)-graphs for the models. FIG. 5 depicts the ROC-curve for SiLeCon 10, NORM_CORR and DTW. A property of these curves is that, as larger the areas under the curve are, as better the performance of the corresponding model will be. According to that, SiLeCon 10 is better than NORM_CORR and much better than DTW what our RE, ACC and F1 results also reflect.

Discussion of the Experimental Results

At first glance, the differences between the accuracies of SiLeCon10 (ACC=0.97807) and the baseline model NORM_CORR (ACC=0.93932) do not seem very significant. In practice, however, they may have a great effect. Let us take an auto-ticketing system for city busses. Reflecting short distances of just one or two minutes journey time between two bus stops in an inner city environment, we assume that six in-vehicle prediction runs can be conducted during this period. To reduce the risk of wrongly billing people not riding in a bus but being, e.g., in a car next to it, the bus operator may run a policy to ticket somebody only if at least five of these six runs predict the user's smartphone being in the bus. Taking the ACC value of NORM_CORR, 95.312% of all passengers are ticketed in average while the rest travels for free. Thus, this system leads to a revenue reduction of nearly 5% which few bus operators would accept. With SiLeCon 10, however, 99.32% of the passengers are correctly billed. The loss of revenue of less than one percent seems to be acceptable since it will be easily outweighed by reducing the number of ticket machines and other infrastructure.

Also for the embarrassing case to bill non-passengers mistakenly, SiLeCon 10 has a significant advantage over NORM_CORR. Using the policy mentioned above, the likelihood of erroneous ticketing is 0.000003% with SiLeCon 10 and 0.000469% with normal correlation. This would mean, that in the latter case, around 171 people are wrongly billed in a year if we assume a hundred thousand non-passengers being checked for in-vehicle presence every day which seems reasonable for a larger city. So, more than three such cases arise every week leading to a lot of compensation claims and bad press. In contrast, using SiLeCon 10, only a single person is wrongly billed in a year which seems acceptable.

Performance in Flat Terrain

Figure 6:
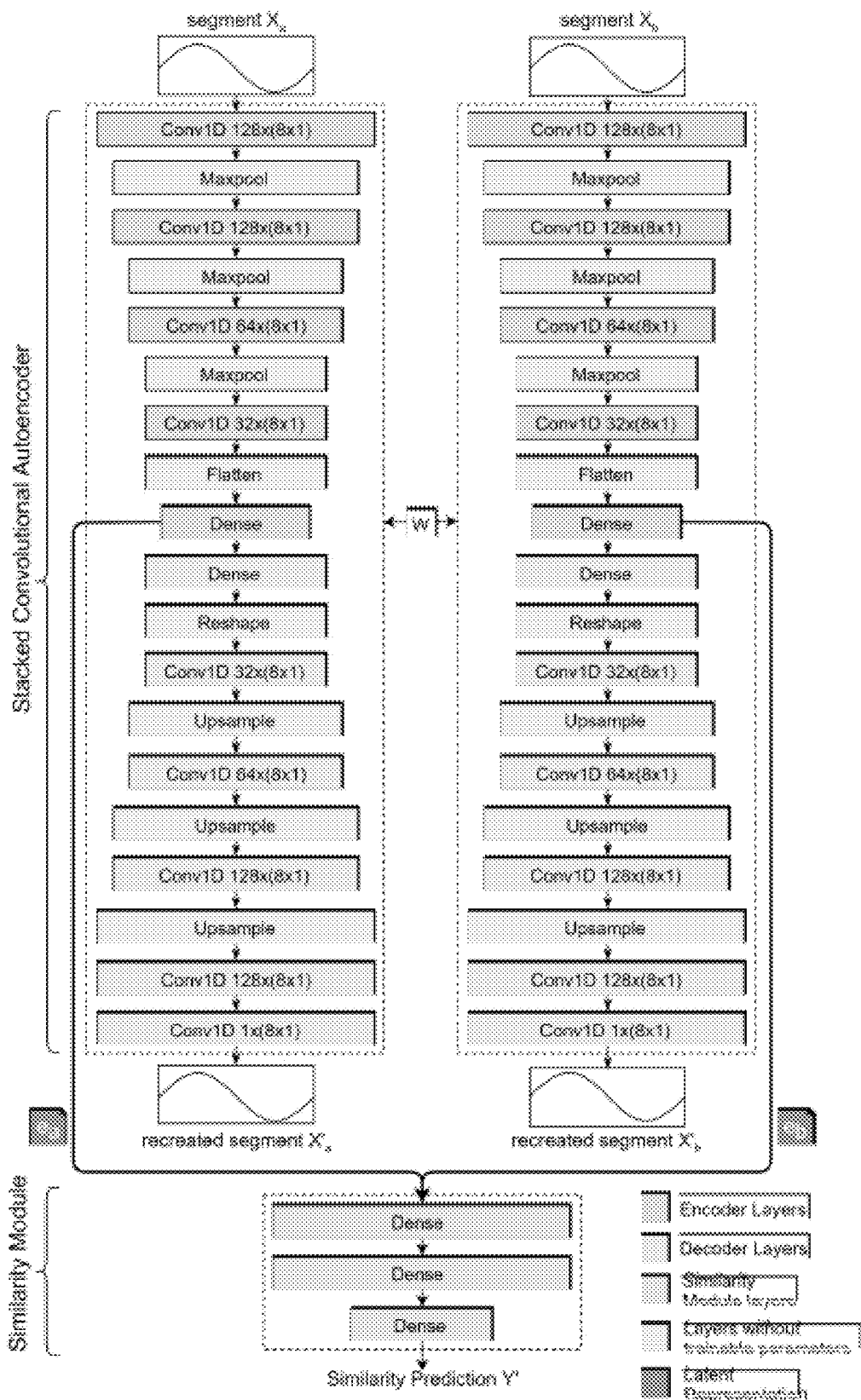
FIG. 6 illustrates an exemplary SiLeCon model architecture, according to example embodiments of the present disclosure.

As mentioned above, our solution of SiLeCon currently uses only barometer data which may cause a problem in level areas. To test SiLeCon for this potential weakness, we made different trips in a very flat region in the central district of Trondheim. Some results of these experiments are shown in FIG. 6. Here, Plot 1 shows the pressure measured by two different phones during the same trip while Plot 2 depicts pressure measurements from two trips using the same phone. The low amplitude in all curves show the flatness of the area. Nevertheless, it is evident that the shapes of the two curves in Plot 1 are very similar while those in Plot 2 differ. These effects are sufficient to let SiLeCon 10 rank Plot 1 positive. This is depicted by Plot 3 stating that each segment of the first trip clearly passes the similarity test. In contrast, Plot 4 shows that none of the segments of the second test passes this test. So, in spite of the flatness of the terrain, both scenarios were correctly decided.

Similarity Execution Time

Figure 7:
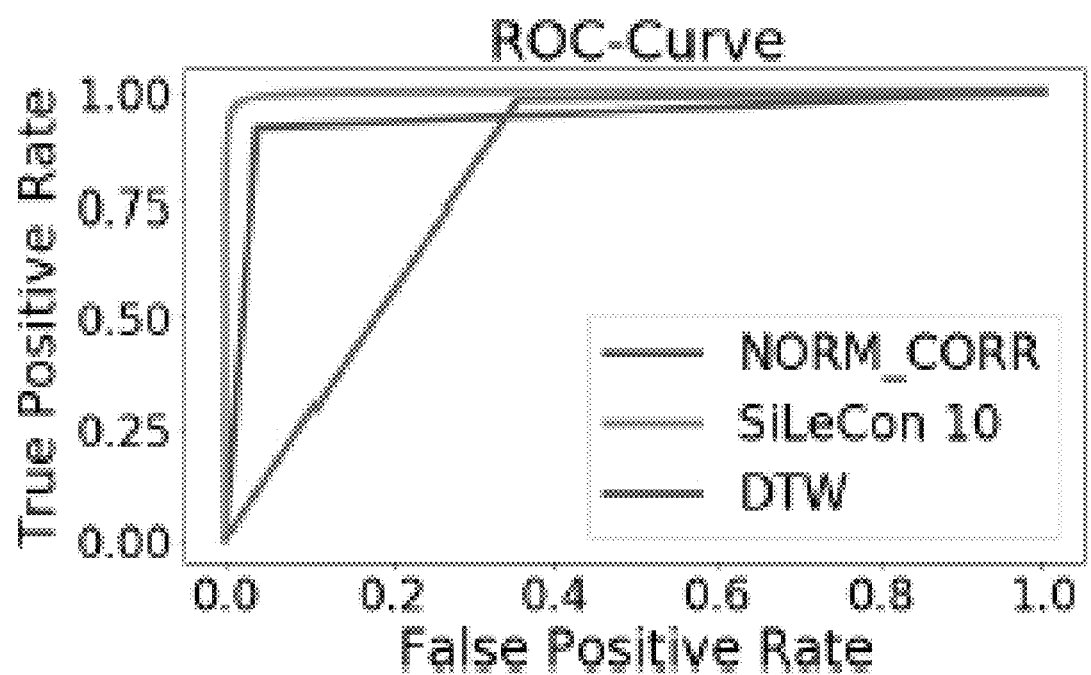
FIG. 7 illustrates an ROC-curve for baseline methods, according to example embodiments of the present disclosure.
Figure 8:
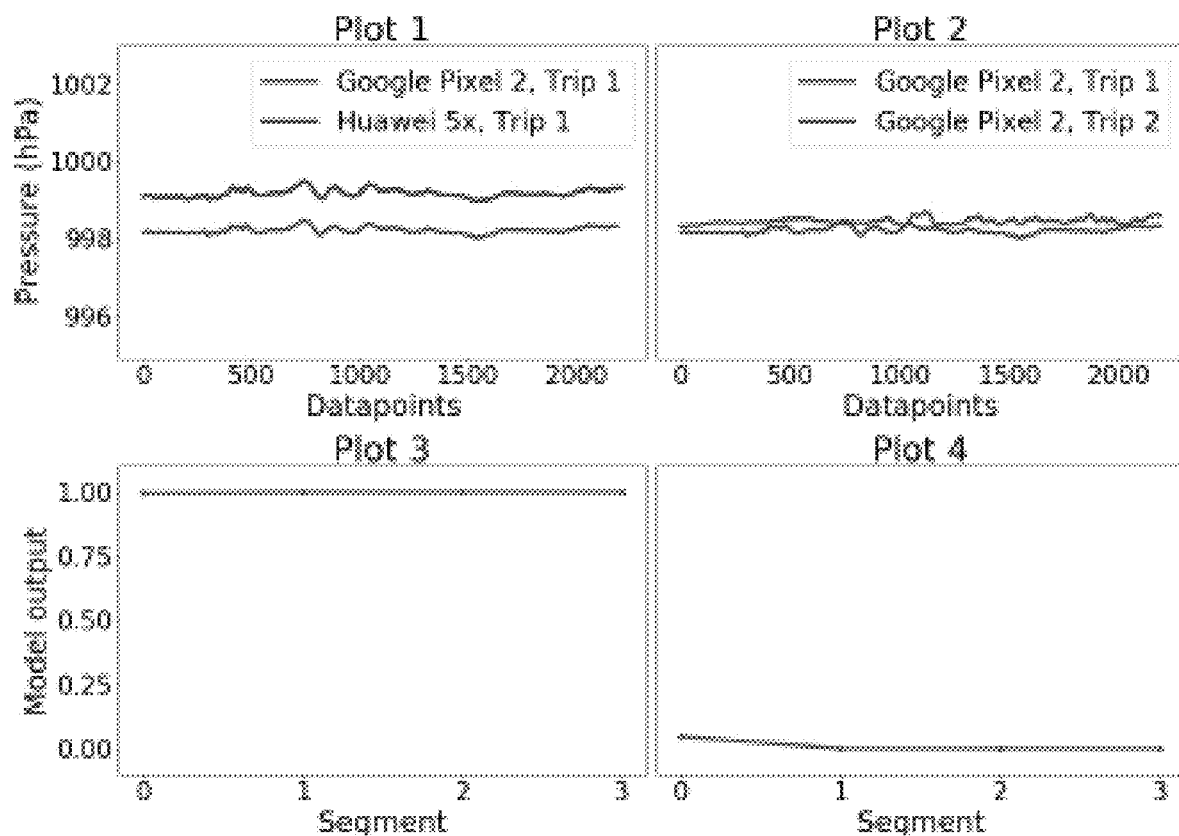
FIG. 8 illustrates exemplary similarity prediction tests for trips on flat roads, according to example embodiments of the present disclosure.
Figure 9:
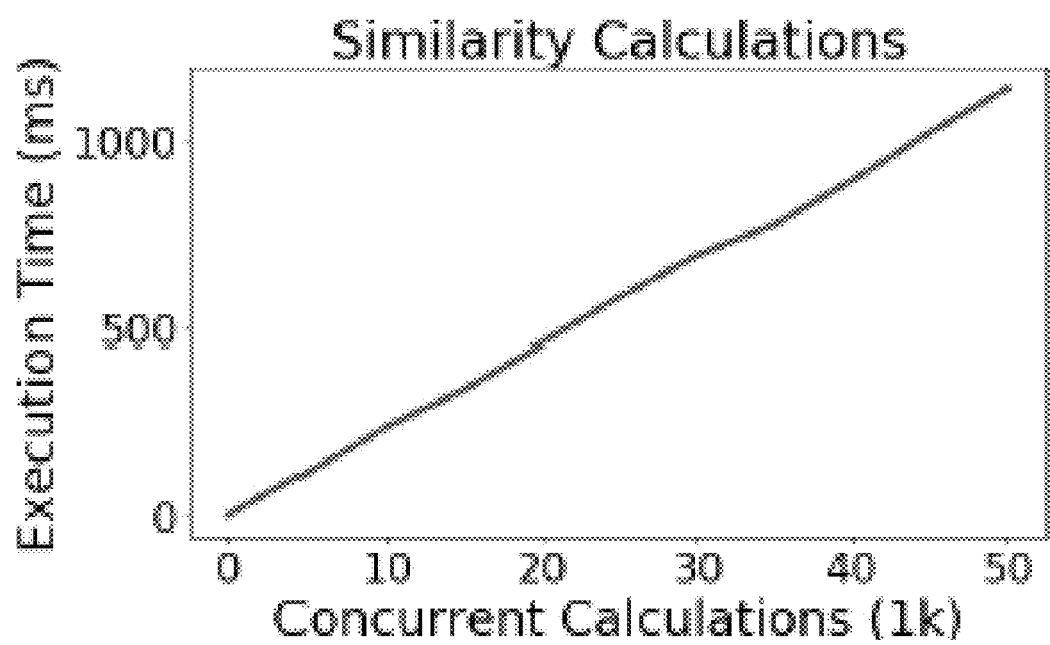
FIG. 9 illustrates exemplary execution times for similarity calculations, according to example embodiments of the present disclosure.

To use SiLeCon-based in-vehicle prediction also in real environments, the cloud server needs to be able to do similarity calculations from a large number of concurrently travelling passengers. The graph in FIG. 7 shows the execution time of this server as a function of increasing concurrent calculations. To increase the operational speed of our system, we exploited the feature of Tensor-flow models to make several simultaneous predictions on multiple inputs. This resulted in an execution time of 1,140 milliseconds for 50,000 concurrent similarity calculations, all running on one desktop equipped with a single GTX 1080 GPU. Since all trips between two stops are far longer than the 1,140 milliseconds, a data center consisting of just 19 of such computers could serve a city like Oslo with its 950,000 daily passengers even if all of them travel at the same time. With the much more spread use of public transport over the day, a smaller number of computers will be sufficient.

Battery Consumption on Smartphones

In this particular discussion, we discuss the battery consumption of SiLeCon which is very important for the acceptance of our approach in practice. In general, there are three main sources of battery drain in out framework: collecting barometer data, the encoder module for data processing, and transmitting the processed data to the cloud.

For our tests, we selected three smartphones from three different manufacturers. The capacities of their batteries are 3000 mAh, 2700 mAh, and 2600 mAh, respectively. Our selection of smartphones takes also age diversity into account. One smartphone is two years old, the second smartphone three years, and the third smartphone five years. The surrounding temperature is a main environmental factor that can influence the performance of batteries. All the tests were run in an experimental environment with a temperature of 19 degrees Celsius which represents the indoor temperature of typical transportation vehicles. Since, according to our measurements, SiLeCon 10 promises the best overall performance, we consider this version of our model for the battery measurement tests.

The battery status is collected from the application using the Batterstats and Battery Historian tools included in the smartphone framework, providing functionality to extract details on battery consumption for all applications running on the device. In order to ensure that the application can collect barometer data and process it at regular intervals (i.e., every 10 seconds in the case of SiLeCon 10), we run the tests in the background with the wake lock parameter enabled to keep CPU processing on.

Reflecting the above mentioned battery consumption factors, we set three different scenarios for our experiments. All three scenarios were run on an initial 100% battery level on all aforementioned smartphones. The scenarios investigated were:

Complete scenario: We consider all three factors of battery consumption, i.e., the barometer data collection, processing of data by the encoder, and transmitting the processed data (i.e., latent data) to the cloud.

Learning scenario: We take the first two factors, i.e., the barometer data collection and the processing of data by the encoder into consideration.

Data collection scenario: We consider only the first factor, i.e., barometer data collection.

The results of our tests are depicted in Table 5. The numbers show clearly that for all three devices, SiLeCon influences the battery consumption only marginally. For all phones, the battery usage will be less than 62 mA considering a total travel time of two hours a day. With a battery capacity of 3000 mAh, this equals 2.1%. This value is considerably lower than most smartphone applications. From this we claim that the battery consumption of SiLeCon is within acceptable limits.

TABLE 5

| Battery Consumption per hour | | | |
|---|---|---|---|
| Scenario | Smartphone 1 | Smartphone 2 | Smartphone 3 |
| Complete | 31 mA | 26 mA | 21 mA |
| Learning | 26 mA | 24 mA | 18 mA |
| Data collection | 25 mA | 23 mA | 15 mA |

Although this disclosure refers to smartphones, embodiments apply equally well to any mobile device. Accordingly, references to the term "smartphones" include the use of any mobile device in the various embodiments.

Figure 10:
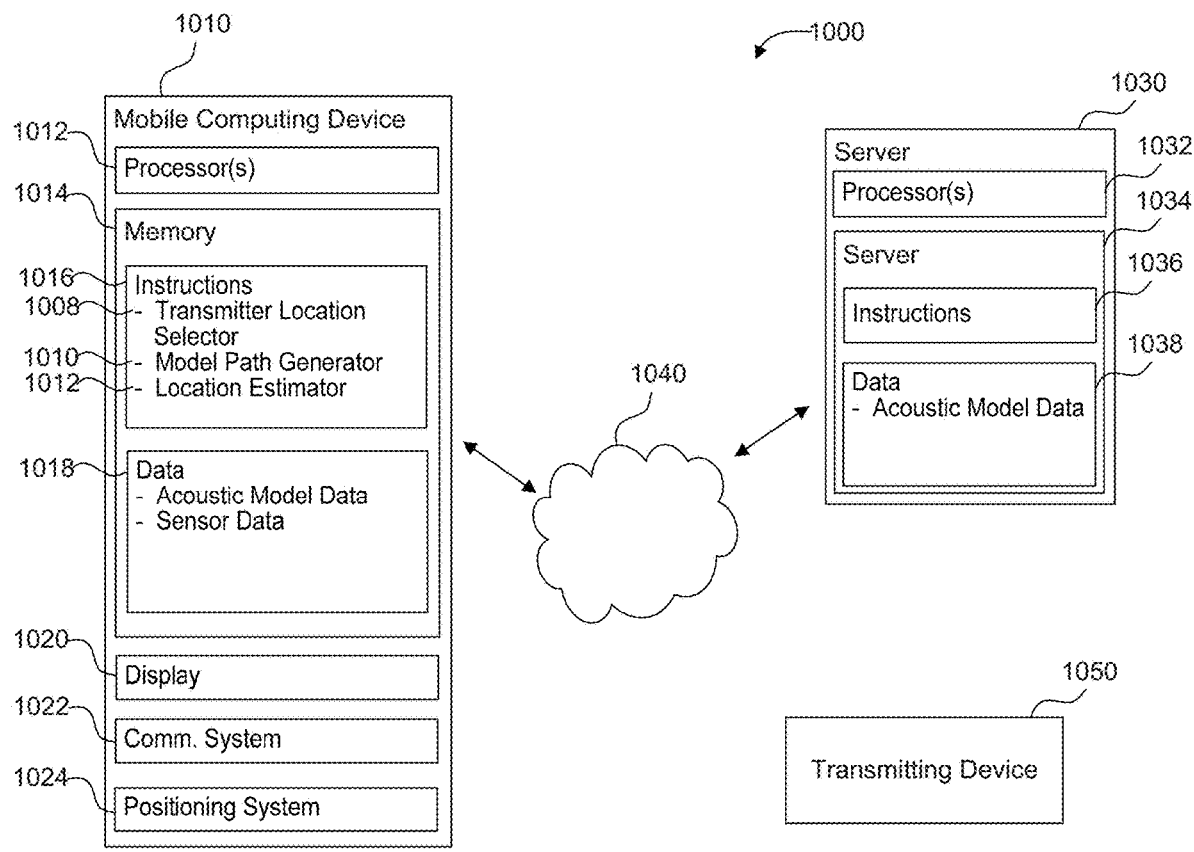
FIG. 10 depicts an example computing system according to example aspects of the present disclosure.

FIG. 10 depicts an example system 1000 that can be used to implement the methods and systems of the present disclosure. In some implementations, the system 1000 can be at least a portion of a real-time locating system configured to determine the locations of various suitable mobile computing devices. The system 1000 can be implemented using a client-server architecture that includes a mobile computing device 1010 that communicates with one or more remote computing devices, such as server 1030. The system 1000 can be implemented using other suitable architectures.

As shown, the system 1000 can include a mobile computing device 1010. The mobile computing device 1010 can be any suitable type of mobile computing device, such as a smartphone, tablet, cellular telephone, wearable computing device, or any other suitable mobile computing device capable of being used in mobile operation. In some implementations, the mobile computing device can be a dedicated tag (e.g. passive or active) or other device for use in the real-time locating system. The mobile computing device 1010 can include one or more processor(s) 1012 and one or more memory devices 1014.

The one or more processor(s) 1012 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices, such as a system on a chip (SoC) or a SoC with an integrated RF transceiver. The one or more memory devices 1014 can include one or more computer-readable media, including, but not limited to, non-transitory computer-readable media, RAM, ROM, hard drives, flash memory, or other memory devices.

The one or more memory devices 1014 can store information accessible by the one or more processors 1012, including instructions 1016 that can be executed by the one or more processors 1012. For instance, the memory devices 1014 can store the instructions 1016 for implementing one or more modules configured to implement the procedures discussed in this application.

The instructions 1016 can further include instructions for implementing a browser, for running a specialized application, or for performing other functions on the mobile computing device 1010. For instance, the specialized application can be used to exchange data with server 1030 over the network 1040. The instructions 1016 can include client-device-readable code for providing and implementing aspects of the present disclosure. For example, the instructions 1016 can include instructions for implementing an application associated with the real-time locating system, or a third party application implementing wayfinding, asset tracking, or other services on the mobile computing device 1010.

The one or more memory devices 1014 can also include data 1018 that can be retrieved, manipulated, created, or stored by the one or more processors 1012. The data 1018 can include, for instance, acoustic model data, sensor data, and/or other data.

The mobile computing device 1010 can include various input/output devices for providing and receiving information from a user, such as a touch screen, touch pad, data entry keys, speakers, and/or a microphone suitable for voice recognition. For instance, the mobile computing device 1010 can have a display 1020 for presenting a user interface to a user.

The mobile computing device 1010 can further include a positioning system 1024. The positioning system 1024 can be any device or circuitry for determining the position of remote computing device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system (e.g. using positioning sensors, such as an inertial measurement unit), a dead reckoning system, based on IP address, by using triangulation and/or proximity to cellular towers, Bluetooth hotspots, BLE beacons, Wi-Fi access points or Wi-Fi hotspots, Wi-Fi time-of-flight, and/or other suitable techniques for determining position.

The mobile computing device 1010 can also include a network interface used to communicate with one or more remote computing devices (e.g. server 1030) over a network 1040. The network interface can include any suitable components for interfacing with one more networks, including for example, transmitters, receivers, ports, controllers, antennas, or other suitable components.

The mobile computing device 1010 can further include a communication system used to communicate with one or more transmitting devices, such as transmitting device 1050. The communication system can include, for instance, one or more transducers (e.g. microphone devices) configured to receive acoustic (e.g. ultrasonic) signals from the transmitting device 1050.

In some implementations, the mobile computing device 1010 can be in communication with a remote computing device, such as a server 1030 over network 1040. Server 1030 can include one or more computing devices. The server 1030 can include one or more computing devices, and can be implemented, for instance, as a parallel or distributed computing system. In particular, multiple computing devices can act together as a single server 1030.

Similar to the mobile computing device 1010, the server 1030 can include one or more processor(s) 1032 and a memory 1034. The one or more processor(s) 1032 can include one or more central processing units (CPUs), and/or other processing devices. The memory 1034 can include one or more computer-readable media and can store information accessible by the one or more processors 1032, including instructions 1036 that can be executed by the one or more processors 1032, and data 1038.

The data 1038 can be stored in one or more databases. The data can include acoustic model data and other data. The one or more databases can be connected to the server 1030 by a high bandwidth LAN or WAN, or can also be connected to server 1030 through network 1040. The one or more databases can be split up so that they are located in multiple locales.

Server 1030 can also include a network interface used to communicate with computing device 1010 over network 1040. The network interface can include any suitable components for interfacing with one more networks, including for example, transmitters, receivers, ports, controllers, antennas, or other suitable components.

Network 1040 can be any type of communications network, such as a local area network (e.g. intranet), wide area network (e.g. Internet), cellular network, or some combination thereof. Network 1040 can also include a direct connection between the mobile computing device 1010 and server 1030. Network 1040 can include any number of wired or wireless links and can be carried out using any suitable communication protocol.

The system 1000 can further include one or more transmitting devices, such as transmitting device 1050. The transmitting device 1050 can transmit acoustic signals. In some implementations, the transmitting device 1050 can transmit other suitable signals, such as radio frequency signals. The transmitting device 1050 can be implemented using any suitable computing device(s). The transmitting device 1050 can include one or more transducers configured to emit acoustic or other suitable signals that can be used by the mobile computing device 1010 to facilitate a location estimation of the mobile computing device 1010 according to example aspects of the present disclosure. Although only one transmitting device is depicted in FIG. 10, it will be appreciated by those skilled in the art that any suitable number of transmitting devices can be included in the system 1000.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of in-vehicle presence detection comprising:
   detecting, by a first mobile device, a signal having a characteristic of an in-vehicle detection system;
   detecting, by a second device, the signal, the signal including content that is unique within a time space of an offset between the first mobile device and the second device, wherein the second device is a second mobile device or is a vehicle mounted device;
   transmitting, by the first mobile device and the second device, a first indication and a second indication to a cloud solution, wherein the first indication and the second indication represent respective detections of the signal having the characteristic of the in-vehicle detection system;
   receiving, by the first mobile device, a first instruction from the cloud solution to analyze one or more first sensor signals to determine a first event;
   receiving, by the second device, a second instruction from the cloud solution to analyze one or more second sensor signals to determine a second event;
   transmitting, by the first mobile device, first information reflecting the first event and its respective first timing based on a first clock of the first mobile device;
   transmitting, by the second device, second information reflecting the second event and its respective second timing based on a second clock of the second device; and
   cross-correlating, by the cloud solution, the first event, the second event, the first timing, the second timing and the content to generate an indication of in-vehicle presence.

2. The method of claim 1, wherein the signal is one of a Bluetooth low energy (BLE) signal, an ultrasound (US) signal, an infrared signal, or a combination thereof.

3. The method of claim 1, wherein the one or more first sensor signals include signals from one or more of an accelerometer, a gyroscope, a magnetometer, or a pressure sensor.

4. The method of claim 1, further comprising:
   utilizing a stacked convolutional encoder configured to perform feature extraction and dimensionality reduction of the signal.

5. The method of claim 1, wherein the cross-correlating includes warping a temporal dimension to find a best correlation in the first event and the second event.

6. The method of claim 1, wherein at least one of the first event or the second event is a transition event that is identified as originating by a transmitter at a transition location on a travel route.

7. An in-vehicle presence detection system comprising at least one processor, the at least one processor configured to:
   detect, by a first mobile device, a signal having a characteristic of an in-vehicle detection system;
   detect, by a second device, the signal, the signal including content that is unique within a time space of an offset between the first mobile device and the second device, wherein the second device is a second mobile device or is a vehicle mounted device;
   transmit, by the first mobile device and the second device, a first indication and a second indication to a cloud solution, wherein the first indication and the second indication represent respective detections of the signal having the characteristic of the in-vehicle detection system;
   receive, by the first mobile device, a first instruction from the cloud solution to analyze one or more first sensor signals to determine a first event;
   receive, by the second device, a second instruction from the cloud solution to analyze one or more second sensor signals to determine a second event;
   transmit, by the first mobile device, first information reflecting the first event and its respective first timing based on a first clock of the first mobile device;
   transmit, by the second device, second information reflecting the second event and its respective second timing based on a second clock of the second device; and
   cross-correlate, by the cloud solution, the first event, the second event, the first timing, the second timing and the content to generate an indication of in-vehicle presence.

8. The system of claim 7, wherein the signal is one of a Bluetooth low energy (BLE) signal, an ultrasound (US) signal, an infrared signal, or a combination thereof.

9. The system of claim 7, wherein the one or more first sensor signals include signals from one or more of an accelerometer, a gyroscope, a magnetometer, or a pressure sensor.

10. The system of claim 7, wherein the at least one processor is further configured to utilize a stacked convolutional encoder configured to perform feature extraction and dimensionality reduction of the signal.

11. The system of claim 7, wherein the at least one processor is further configured to cross-correlate by warping a temporal dimension to find a best correlation in the first event and the second event.

12. The system of claim 7, wherein at least one of the first event or the second event is a transition event that is identified as originating by a transmitter at a transition location on a travel route.

13. A method of in-vehicle presence detection comprising:
   detecting, by a first mobile device, a signal having a characteristic of an in-vehicle detection system;
   detecting, by a second device, the signal, the signal including content that is unique within a time space of an offset between the first mobile device and the second device, wherein the second device is a second mobile device or is a vehicle mounted device;
   transmitting, by the first mobile device and the second device, a first indication and a second indication to a cloud solution, wherein the first indication and the second indication represent respective detections of the signal having the characteristic of the in-vehicle detection system;
   selecting, using an algorithm executed by the first mobile device, one or more first portions of one or more first sensor signals for analysis to determine a first event;
   selecting, using the algorithm executed by the second device, one or more second portions of one or more second sensor signals for analysis to determine a second event;
   transmitting, by the first mobile device, first information reflecting the first event and its respective first timing based on a first clock of the first mobile device;
   transmitting, by the second device, second information reflecting the second event and its respective second timing based on a second clock of the second device; and
   cross-correlating, by the cloud solution, the first event, the second event, the first timing, the second timing and the content to generate an indication of in-vehicle presence.

14. The method of claim 13, wherein the signal is one of a Bluetooth low energy (BLE) signal, an ultrasound (US) signal, an infrared signal, or a combination thereof.

15. The method of claim 13, wherein the one or more first sensor signals include signals from one or more of an accelerometer, a gyroscope, a magnetometer, or a pressure sensor.

16. The method of claim 13, further comprising:
   utilizing a stacked convolutional encoder configured to perform feature extraction and dimensionality reduction of the signal.

17. The method of claim 13, wherein the cross-correlating includes warping a temporal dimension to find a best correlation in the first event and the second event.

18. The method of claim 13, wherein at least one of the first event or the second event is a transition event that is identified as originating by a transmitter at a transition location on a travel route.

19. An in-vehicle presence detection system comprising at least one processor, the at least one processor configured to:
   detect, by a first mobile device, a signal having a characteristic of an in-vehicle detection system;
   detect, by a second device, the signal, the signal including content that is unique within a time space of an offset between the first mobile device and the second device, wherein the second device is a second mobile device or is a vehicle mounted device;
   transmit, by the first mobile device and the second device, a first indication and a second indication to a cloud solution, wherein the first indication and the second indication represent respective detections of the signal having the characteristic of the in-vehicle detection system;
   select, using an algorithm executed by the first mobile device, one or more first portions of one or more first sensor signals for analysis to determine a first event;
   select, using the algorithm executed by the second device, one or more second portions of one or more second sensor signals for analysis to determine a second event;
   transmit, by the first mobile device, first information reflecting the first event and its respective first timing based on a first clock of the first mobile device;
   transmit, by the second device, second information reflecting the second event and its respective second timing based on a second clock of the second device; and
   cross-correlate, by the cloud solution, the first event, the second event, the first timing, the second timing and the content to generate an indication of in-vehicle presence.

20. The system of claim 19, wherein the signal is one of a Bluetooth low energy (BLE) signal, an ultrasound (US) signal, an infrared signal, or a combination thereof.

21. The system of claim 19, wherein the one or more first sensor signals include signals from one or more of an accelerometer, a gyroscope, a magnetometer, or a pressure sensor.

22. The system of claim 19, wherein the at least one processor is further configured to utilize a stacked convolutional encoder configured to perform feature extraction and dimensionality reduction of the signal.

23. The system of claim 19, wherein the at least one processor is further configured to cross-correlate by warping a temporal dimension to find a best correlation in the first event and the second event.

24. The system of claim 19, wherein at least one of the first event or the second event is a transition event that is identified as originating by a transmitter at a transition location on a travel route.

* * * * *